US010570700B2

(12) United States Patent
Nelson et al.

(10) Patent No.: US 10,570,700 B2
(45) Date of Patent: Feb. 25, 2020

(54) FRACTURING FLUIDS AND METHODS OF TREATING HYDROCARBON FORMATIONS

(71) Applicants: Scott Gregory Nelson, Cypress, TX (US); Hong Sun, Houston, TX (US); Jia Zhou, Cypress, TX (US); Leiming Li, Sugar Land, TX (US); Xiaolan Wang, Spring, TX (US); Qi Qu, Spring, TX (US)

(72) Inventors: Scott Gregory Nelson, Cypress, TX (US); Hong Sun, Houston, TX (US); Jia Zhou, Cypress, TX (US); Leiming Li, Sugar Land, TX (US); Xiaolan Wang, Spring, TX (US); Qi Qu, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/043,455

(22) Filed: Jul. 24, 2018

(65) Prior Publication Data
US 2018/0328147 A1 Nov. 15, 2018

Related U.S. Application Data

(62) Division of application No. 15/084,833, filed on Mar. 30, 2016, now Pat. No. 10,113,396.

(60) Provisional application No. 62/140,105, filed on Mar. 30, 2015.

(51) Int. Cl.
| | |
|---|---|
| *E21B 37/06* | (2006.01) |
| *C09K 8/68* | (2006.01) |
| *C09K 8/64* | (2006.01) |
| *C09K 8/88* | (2006.01) |
| *C09K 8/82* | (2006.01) |
| *C09K 8/90* | (2006.01) |
| *C09K 8/52* | (2006.01) |
| *E21B 33/134* | (2006.01) |
| *C09K 8/62* | (2006.01) |
| *C09K 8/70* | (2006.01) |
| *C09K 8/80* | (2006.01) |
| *E21B 43/26* | (2006.01) |
| *E21B 43/267* | (2006.01) |
| *C09K 8/76* | (2006.01) |
| *E21B 33/138* | (2006.01) |
| *C09K 8/575* | (2006.01) |
| *E21B 43/04* | (2006.01) |
| *C09K 8/035* | (2006.01) |
| *C09K 8/12* | (2006.01) |
| *C09K 8/34* | (2006.01) |
| *E21B 21/00* | (2006.01) |

(52) U.S. Cl.
CPC .............. *E21B 37/06* (2013.01); *C09K 8/035* (2013.01); *C09K 8/12* (2013.01); *C09K 8/34* (2013.01); *C09K 8/52* (2013.01); *C09K 8/5756* (2013.01); *C09K 8/62* (2013.01); *C09K 8/64* (2013.01); *C09K 8/68* (2013.01); *C09K 8/685* (2013.01); *C09K 8/70* (2013.01); *C09K 8/703* (2013.01); *C09K 8/706* (2013.01); *C09K 8/76* (2013.01); *C09K 8/80* (2013.01); *C09K 8/82* (2013.01); *C09K 8/88* (2013.01); *C09K 8/887* (2013.01); *C09K 8/90* (2013.01); *E21B 21/00* (2013.01); *E21B 21/003* (2013.01); *E21B 33/134* (2013.01); *E21B 33/138* (2013.01); *E21B 43/04* (2013.01); *E21B 43/26* (2013.01); *E21B 43/267* (2013.01); *C09K 2208/26* (2013.01)

(58) Field of Classification Search
None
See application file for complete search history.

(56) References Cited

U.S. PATENT DOCUMENTS

| | | | |
|---|---|---|---|
| 3,425,971 A | 2/1969 | Gugliemelli et al. | |
| 4,286,082 A | 8/1981 | Tsubakimoto et al. | |
| 5,080,809 A | 1/1992 | Stahl et al. | |
| 5,086,841 A | 2/1992 | Reid et al. | |
| 5,143,157 A | 9/1992 | Harms | |
| 5,441,109 A | 8/1995 | Gupta et al. | |
| 5,806,597 A | 9/1998 | Tjon-Joe-Pin et al. | |
| 5,981,447 A * | 11/1999 | Chang | C09K 8/512 166/295 |

(Continued)

FOREIGN PATENT DOCUMENTS

CN 103816821 A 5/2014

OTHER PUBLICATIONS

"VaporFrac Fracturing Fluid", Retrieved from the internet [https://www.bakerhughes.com/products-and-services/pressure-pumping/hydraulic-fracturing/fracturing-fluid-systems-proppant-technology/proppant-technology-vaporfrac], Baker Hughes; 10 pages.

(Continued)

*Primary Examiner* — Andrew Sue-Ako
(74) *Attorney, Agent, or Firm* — Cantor Colburn LLP

(57) ABSTRACT

A method of fracturing a subterranean formation penetrated by a well comprises: forming a fracturing composition comprising a carrier fluid; and a superabsorbent polymer component comprising one or more of the following: a first composite of a proppant and a first superabsorbent polymer in an unhydrated form, the first superabsorbent polymer being at least partially embedded in a void area of the proppant; a coated superabsorbent polymer; a superabsorbent material having a three-dimensional network; or a second composite of a second superabsorbent polymer and a slow-release breaker; and pumping the hydraulic fracturing composition into the subterranean formation to create or enlarge a fracture.

8 Claims, No Drawings

(56) References Cited

U.S. PATENT DOCUMENTS

| | | | |
|---|---|---|---|
| 6,164,380 A | 12/2000 | Davis | |
| 6,169,058 B1 | 1/2001 | Le et al. | |
| 6,410,489 B1 | 6/2002 | Zhang et al. | |
| 6,419,019 B1 | 7/2002 | Palmer et al. | |
| 7,971,643 B2 | 7/2011 | Brannon et al. | |
| 8,109,336 B2 | 2/2012 | Wheeler et al. | |
| 8,839,859 B2 | 9/2014 | Ivan et al. | |
| 2002/0007949 A1 | 1/2002 | Tolman et al. | |
| 2002/0040812 A1 | 4/2002 | Heying | |
| 2003/0236171 A1 | 12/2003 | Nguyen et al. | |
| 2004/0040713 A1 | 3/2004 | Nguyen et al. | |
| 2005/0080182 A1 | 4/2005 | Ahmed et al. | |
| 2006/0086501 A1 | 4/2006 | Creel et al. | |
| 2007/0131424 A1 | 6/2007 | Fripp | |
| 2008/0085843 A1 | 4/2008 | Wang et al. | |
| 2009/0082228 A1 | 3/2009 | Parris et al. | |
| 2009/0095324 A1 | 4/2009 | Crowther et al. | |
| 2009/0221453 A1* | 9/2009 | Mukhopadhyay | C09K 8/68 507/202 |
| 2009/0264325 A1 | 10/2009 | Atkins et al. | |
| 2010/0089581 A1 | 4/2010 | Nguyen et al. | |
| 2010/0099781 A1 | 4/2010 | Tian et al. | |
| 2010/0126735 A1 | 5/2010 | Allison et al. | |
| 2011/0036583 A1* | 2/2011 | Willberg | E21B 43/26 166/308.1 |
| 2011/0120719 A1 | 5/2011 | Soane et al. | |
| 2011/0253454 A1 | 10/2011 | Freeman | |
| 2012/0252264 A1 | 10/2012 | Zraik | |
| 2012/0285692 A1 | 11/2012 | Potapenko et al. | |
| 2013/0056213 A1 | 3/2013 | Medvedev et al. | |
| 2013/0065765 A1 | 3/2013 | Selifonov et al. | |
| 2013/0233545 A1 | 9/2013 | Mahoney et al. | |
| 2013/0248191 A1 | 9/2013 | Nguyen | |
| 2013/0341030 A1 | 12/2013 | Brannon et al. | |
| 2014/0000896 A1* | 1/2014 | Wang | C09K 8/62 166/300 |
| 2014/0000897 A1 | 1/2014 | Wang et al. | |
| 2014/0024561 A1 | 1/2014 | Reddy et al. | |
| 2014/0121136 A1 | 5/2014 | Mirakyan et al. | |
| 2014/0158355 A1 | 6/2014 | Wuthrich et al. | |
| 2014/0251610 A1 | 9/2014 | Brannon et al. | |
| 2014/0262228 A1 | 9/2014 | Deville et al. | |
| 2014/0332213 A1 | 11/2014 | Zhou | |
| 2014/0332214 A1 | 11/2014 | Zhou et al. | |
| 2014/0338916 A1 | 11/2014 | Vasquez et al. | |
| 2015/0096751 A1 | 4/2015 | Shen et al. | |
| 2015/0210912 A1 | 7/2015 | Amanullah et al. | |
| 2016/0289530 A1 | 10/2016 | Nelson | |
| 2016/0289541 A1 | 10/2016 | Zhou et al. | |
| 2016/0289542 A1 | 10/2016 | Nelson et al. | |
| 2016/0289547 A1 | 10/2016 | Gupta et al. | |
| 2016/0289549 A1 | 10/2016 | Nelson et al. | |
| 2016/0290104 A1 | 10/2016 | Nelson et al. | |
| 2016/0347985 A1 | 12/2016 | Li et al. | |
| 2018/0306006 A1 | 10/2018 | Gupta et al. | |

OTHER PUBLICATIONS

Dragan, "Design and applications of interpenetrating polymer network hydrogels, a review", Chemical Engineering Journal 243 (2014), pp. 572-590.

European Search Report for European Application No. 16774051.3 dated Nov. 7, 2018, 18 pages.

European Search Report for European Application No. 16774070.3 dated Nov. 7, 2018, 15 pages.

International Search Report, International Application No. PCT/US2016/024926, dated Oct. 13, 2016, Korean Intellectual Property Office; International Search Report 3 Pages.

Written Opinion of the International Searching Authority, International Application No. PCT/US2016/024926, dated Oct. 13, 2016, Korean Intellectual Property Office; Written Opinion 9 pages.

* cited by examiner

FRACTURING FLUIDS AND METHODS OF TREATING HYDROCARBON FORMATIONS

CROSS REFERENCE TO RELATED APPLICATION

This application is a divisional of U.S. application Ser. No. 15/084,833, filed Mar. 30, 2016, which claims the benefit of U.S. Patent Application No. 62/140,105, filed Mar. 30, 2015, both of which are incorporated by reference in their entirety herein.

BACKGROUND

The disclosure relates to fracturing fluids and methods of treating hydrocarbon formations, in particular fracturing fluids containing superabsorbent polymers and the use thereof in fracturing applications.

Hydraulic fracturing is a stimulation process for creating high-conductivity communication with a large area of a subterranean formation. The process increases the effective wellbore area within the formation so that entrapped oil or gas production can be accelerated. The efficiency of the process is often measured by the total amount of contacted surface area that results from the stimulation treatment.

During hydraulic fracturing, a fracturing fluid is pumped at pressures exceeding the fracture pressure of the targeted reservoir rock in order to create or enlarge fractures within the subterranean formation penetrated by the wellbore. Once the fracture is initiated, subsequent stages of fluid containing chemical agents, as well as proppants, are pumped into the created fracture. The fracture generally continues to grow during pumping and the proppants remain in the fracture in the form of a permeable pack that serves to prop the fracture open. Once the treatment is completed, the fracture closes onto the proppants. The proppants keep the created fracture open, providing a highly conductive pathway for hydrocarbons and/or other formation fluids to flow into the wellbore.

The fracturing fluids can be broken down to minimal viscosity and allowed to flow back before production. The timing of breaking can be important for practical concerns. A subtle balance often has to be struck between the initial viscosity and final viscosity after breaking. If the fracturing fluids break too early, the proppant can separate from the fracturing fluids and settle to the bottom of the fracture before a fracturing treatment is completed. In this situation, the geometry of the fracture and well productivity can be impaired.

Despite all the advances in the art, there is still a need for alternative compositions and methods to fracture hydrocarbon formations. It would be an advantage if such compositions and methods have improved proppant transportation capacities. It would be a further advantage if compositions and methods can be provided to control the timing to break the fracturing fluids.

BRIEF DESCRIPTION

In an embodiment, a method of fracturing a subterranean formation penetrated by a well comprises: forming a fracturing composition comprising a carrier fluid; and a superabsorbent polymer component comprising one or more of the following: a first composite of a proppant and a first superabsorbent polymer in an unhydrated form, the first superabsorbent polymer being at least partially embedded in a void area of the proppant; a coated superabsorbent polymer; a superabsorbent material having a three-dimensional network; or a second composite of a second superabsorbent polymer and a slow-release breaker; and pumping the hydraulic fracturing composition into the subterranean formation to create or enlarge a fracture.

In another embodiment, a method of fracturing a subterranean formation penetrated by a well comprises: forming a fracturing composition comprising a carrier fluid; a proppant; about 10 pounds to about 100 pounds of a superabsorbent polymer per one thousand gallons of the fracturing composition; and about 1 pound to about 30 pounds or 4 to 20 pounds of a viscosity modifying agent per one thousand gallons of the fracturing composition, the viscosity modifying agent comprising one or more of the following: diutan; starch-acrylonitrile graft polymer hydrolysate; sulfonated polystyrene; polyvinyl alcohol; polyvinyl pyrrolidone; or polyacrylonitrile; and pumping the hydraulic fracturing composition into the subterranean formation to create or enlarge a fracture.

In yet another embodiment, a method of fracturing a subterranean formation penetrated by a well comprises: forming a fracturing composition comprising a carrier fluid; a proppant; about 30 pounds to about 80 pounds of a polymer comprising one or more of the following: konjac glucomannan; starch-acrylonitrile graft polymer hydrolysate; carboxymethyl cellulose; crosslinked polyacrylates; sulfonated polystyrene; hydrolyzed polyacrylamide; polyvinyl alcohol; polyvinyl acetate; polyethylene oxide; polyvinyl pyrrolidone; or polyacrylonitrile.

In still another embodiment, a method of fracturing a subterranean formation penetrated by a well comprises forming a fracturing composition comprising a carrier fluid, a linear guar, a superabsorbent polymer present in an amount effective to reduce fluid loss during a fracturing operation, optionally a crosslinking agent for the linear guar; and pumping the hydraulic fracturing composition into the subterranean formation to create or enlarge a fracture.

A method of fracturing a subterranean formation penetrated by a well comprises: forming a fracturing composition comprising a carrier fluid, a proppant, a superabsorbent polymer, a breaker effective to break the superabsorbent polymer at a temperature greater than about 250° F. in the absence of any activators, an encapsulated activator comprising an activator encapsulated within an encapsulant, the activator being effective to activate the breaker so that the breaker or a derivative thereof breaks the superabsorbent at a temperature less than about 200° F.; pumping the hydraulic fracturing composition into the subterranean formation to create or enlarge a fracture; allowing the activator to diffuse out of the encapsulant; and breaking the superabsorbent polymer.

A method of fracturing a subterranean formation penetrated by a well comprises: injecting into the subterranean formation a first fracturing composition comprising a first carrier fluid, a proppant, a superabsorbent polymer, and one of a breaker and an activator for the breaker; injecting a second fracturing composition into the subterranean formation, the second fracturing composition comprising a second carrier fluid, and the breaker or the activator not included in the first fracturing composition; and breaking the superabsorbent polymer after injecting the second fracturing composition at a temperature of less than about 200° F.

A method of fracturing a subterranean formation penetrated by a well comprises: injecting into the subterranean formation a first fracturing composition comprising a first carrier fluid, a proppant, and a superabsorbent polymer, the first fracturing composition being free of breakers for the superabsorbent polymer; injecting a second fracturing composition into the subterranean formation, the second fracturing composition comprising a second carrier fluid, and a breaker effective to break the superabsorbent polymer at a temperature of less than about 200° F.; and breaking the superabsorbent polymer after injecting the second fracturing composition.

DETAILED DESCRIPTION

Today about one third of the fracturing fluid used in the field is based on linear guar. These linear guar based fluids typically contain from 10 to 40 ppt of standard guar polymer. The associated fluid viscosity of these fluids ranges from 5 cP to 30 cP. It has been found that a composition containing a superabsorbent polymer can be used to replace linear guar based fluid in fracturing applications. The superabsorbent polymer allows for the generation of an equal or greater viscosity fracturing fluid while using only a fraction of conventional polymer loadings. Linear guar based fluids are relatively damaging to a formation because of their low regained conductivity after breaking. In contrast, the superabsorbent polymer has shown high regained conductivities after breaking.

As discussed herein, a superabsorbent polymer is a polymer that is capable of absorbing large amounts of aqueous liquids, such as water, brine, acid, or base, with swelling and the formation of a gel or viscous material, and retains the absorbed fluid under a certain pressure or temperature. Superabsorbent polymers can be used in fracturing compositions to transport proppant particles to fractures. The inventors have found various methods to improve the efficiency of superabsorbent polymers to transport proppant.

In an embodiment, it has been found that superabsorbent polymers in unhydrated form can be placed within a proppant or at least partially embedded into a void area of the proppant. The placement of a superabsorbent polymer into a proppant allows for polymer swelling thus in combination with the proppant reduces the resulting particle's effective density within the fracturing fluid. In addition the polymer particles when swollen would act to transport, by means of towing, the proppant along as the superabsorbent polymer is carried deeper into the fracture. The ability to affect the settling rate of proppants can then be addressed.

The composite can include any of the superabsorbent polymers disclosed herein except that the superabsorbent polymer is in an unhydrated form. The proppant used to make the composite has empty spaces or pores. The porous proppant includes any naturally occurring or manufactured or engineered porous ceramic particulate material that has an inherent and/or induced porosity. The types of proppants that could be used include hollow rod proppants, and those where void space is found, or spaces intentionally created on the proppants surface. Proppants with void areas include those within the line of LiteProp™ materials commercially available from Baker Hughes Inc.

A commercially available instrument, ACCUPYC 1330 Automatic Gas Pycnometer (Micromeritics, Norcross, Ga.), that uses helium as an inert gas and the manufacturer's recommended procedure can be used to determine the internal porosity of the particulates. The internal porosity of the proppant used to make the composite is generally from about 5 to about 40 volume percent or about 10 to about 35 volume percent or about 15 to about 25 volume percent. In an embodiment, the proppant in the composite has an apparent specific gravity of less than about 2.4.

Examples of non-natural porous particulate materials for use in the composite include, but are not limited to, porous ceramic particles such as those particles available from Carbo Ceramics Inc. as ECONOPROP, and those fired kaolinitic described in U.S. Pat. No. 5,188,175. As described in this patent such particles may include solid spherical pellets or particles from raw materials (such as kaolin clay) having an alumina content of between about 25% and 40% and a silica content of between about 50% and 65%. A starch binder may be employed. Such particles may be characterized as having a ratio of silicon dioxide to alumina content of from about 1.39 to about 2.41, and an ASG of between about 2.20 and about 2.60 or between about 2.20 and about 2.70.

It will also be understood that porous ceramic particles may be selectively manufactured from raw materials such as those described in U.S. Pat. No. 5,188,175; U.S. Pat. Nos. 4,427,068; 4,522,731, such as by inclusion of selected process steps in the initial material manufacturing process to result in a material that possesses desired characteristics of porosity, permeability, apparent density or ASG, and combinations thereof. For example, such raw materials may be fired at relatively low temperature of about 1235° F. or about 1300° F. to achieve a desired crystalline structure and a more highly porous and lighter structure. In one exemplary embodiment of such particles, about 20/40 mesh size porous material fired kaolinitic particles from Carbo Ceramics Inc. may be selected for use in the composite. These particles have the following internal characteristics: bulk apparent density about 1.16, internal porosity about 59.3%.

As used herein, the term "embedded" shall further refer to partially or completely impregnated with a superabsorbent polymer, by for example, vacuum and/or pressure impregnation. For example, porous proppants may be immersed in a superabsorbent polymer in an unhydrated form and then exposed to pressure and/or vacuum to at least partially penetrate or impregnate the proppant. The extent of penetration of the superabsorbent polymer of the porous proppant is from less than about 1% penetration by volume to less than about 25% penetration by volume.

The composite can be made by treating with the porous proppant with superabsorbent polymers using any suitable wet or dry process. The porosity characteristics of the porous proppants allow the unhydrated superabsorbent polymer to be drawn at least partially into the porous matrix of the porous proppants by capillary action. For example, one or more superabsorbent polymers may be drawn at least partially into the porous matrix of the porous particulate material using a vacuum, and/or may be forced at least partially into the porous matrix under pressure. In another embodiment a sheet of a superabsorbent polymer is mixed and pressed against proppant particles so that the superabsorbent polymer at least partially penetrates the empty spaces of the proppant particles thus locking the proppant particles to the superabsorbent polymer sheet.

The relative amounts of the superabsorbent polymer and the proppant in the composite as well as the relative amount of the composite in the fracturing compositions are selected such that the proppant is present in a mass concentration from 0.10 pounds per gallon (lb/gal) to 20 lb/gal, specifically 0.25 lb/gal to 16 lb/gal, and more specifically 0.25 lb/gal to 12 lb/gal, based on the total volume of the composition, and the superabsorbent polymer is present in a mass concentration from 10 pounds of SAP per one thousand gallons of fluid (ppt) to 200 ppt, specifically 20 ppt to 100 ppt, and more specifically 30 ppt to 80 ppt, based on the total volume of the composition. In an embodiment the composite of a superabsorbent polymer and a proppant is present in an amount of about 10 pounds to about 200 pounds, about 20 pounds to about 100 pounds, or about 30 pounds to about 80 pounds of the composite per one thousand gallons of the fracturing compositions.

In another embodiment, it has also been found that the proppant-suspension ability of the hydraulic fracture composition can be improved by including a superabsorbent material having a three-dimensional network. As used herein, a three-dimensional network refers to a network comprising a superabsorbent polymer having negative charges and a cationic or nonionic polymer bonded to the superabsorbent polymer having negative charges. Without wishing to be hound by theory, it is believed that a three-dimensional network is created by forces such as Van der Waals forces between the negatively charged superabsorbent polymers and the cationic or nonionic polymers. Further without wishing to be bound by theory, it is believed that once the superabsorbent polymer spheres are (weakly) connected by the polymer chains of the low dose cationic or nonionic polymer into a three-dimensional network, the proppant suspension and carrying capability is greatly improved. Exemplary superabsorbent polymers having negative charges include anionic polymers disclosed herein. A copolymer of acrylic acid and sodium acrylate with crosslinks derived from polyethylene glycol diacrylate is specifically mentioned. Exemplary cationic polymers include cationic acrylamide copolymers. Exemplary nonionic polymers include polyvinyl alcohol, polyvinyl acetate, or a combination comprising at least one of the foregoing. The amount of the cation or nonionic polymers in the superabsorbent material having a three-dimensional network can be about 0.1 wt. % to about 30 wt. % or 0.5 wt. % to 20 wt. % based on the total weight of the superabsorbent material having a three-dimensional network.

In another embodiment, it has been found that coated superabsorbent polymers can be used to slow down the hydration rate and to reduce shearing damage to superabsorbent polymer-containing fluids thus increasing superabsorbent polymers' proppant carrying capacity.

The coating for the coated superabsorbent polymer includes an organic compound, a thermoset or thermoplastic polymer, or a wax. An organic compound includes epoxy, phenolic, polyurethane, polycarbodiimide, polyamide, polyamide imide, furan resins, or a combination thereof. The phenolic polymer is, e.g., a phenol formaldehyde resin obtained by the reaction of phenol, bisphenol, or derivatives thereof with paraformaldehyde. Exemplary thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Exemplary thermosets include epoxy, phenolic (a true thermosetting polymer such as resole or a thermoplastic resin that is rendered thermosetting by a hardening agent), polyester resin, polyurethanes, epoxy-modified phenolic polymers, and derivatives thereof. Wax is specifically mentioned.

Optionally the coating can be cured depending on the specific coating material used. Suitable curing agent for the coating is nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; sulfur-containing compounds such as polysulfides, polymercaptans; and catalytic curing agents such as tertiary amines, Lewis acids, Lewis bases; or a combination thereof. Any methods known in the art to coat solid particles or fibers can be used.

The hydraulic fracturing composition can also comprise low dose viscosity modifying agents, i.e., polymers with large viscosity at low shear rates such as xanthan, diutan to further improve its proppant suspension ability. In addition, adding viscoelastic surfactant (VES) gelling agents also enhance proppant suspension. Other polymers include starch-acrylonitrile graft polymer hydrolysate, carboxymethyl cellulose, crosslinked polyacrylate, sulfonated polystyrene, hydrolyzed polyacrylamide, polyvinyl alcohol, polyethylene oxide, polyvinyl pyrrolidone, polyacrylonitrile, or a combination comprising at least one of the foregoing. Diutan, starch-acrylonitrile graft polymer hydrolysate, sulfonated polystyrene, polyvinyl alcohol, polyvinyl pyrrolidone, and polyacrylonitrile are specifically mentioned. In some embodiments, the viscosity modifying agents are not crosslinked. If used, the viscosity modifying agents can be present in an amount of about 1 to 30 pounds or about 4 to about 20 pounds per one thousand gallons of the fracturing composition.

The viscoelastic surfactants suitable useful herein include, but are not necessarily limited to, non-ionic, cationic, amphoteric, and zwitterionic surfactants. These surfactants can be used either alone or in combination with inorganic salts or other surfactants to create ordered structures, which result in increased viscosity of aqueous-based fluids. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. When the surfactant is cationic, it is associated with a negative counterion, which can be an inorganic anion such as a sulfate, a nitrate, a perchlorate or a halide such as Cl, Br or with an aromatic organic anion such as salicylate, naphthalene sulfonate, p and m chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate. When the surfactant is anionic, it is associated with a positive counterion, for example, Na+ or K+. When it is zwitternionic, it is associated with both negative and positive counterions, for example, Cl and Na+ or K+. Other viscoelastic surfactant has been described in U.S. Pat. Nos. 7,081,439 and 7,279,446. The viscoelastic surfactants may be used in conjunction with an inorganic water-soluble salt or organic additive such as phthalic acid, salicylic acid or their salts.

Amine oxide viscoelastic surfactants can also be used. The amine oxide gelling agents $RN^+(R')_2O^-$ may have the following structure:

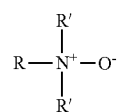

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

The superabsorbent polymers are polymerized from non-ionic, anionic, cationic monomers, or a combination comprising at least one of the foregoing. Polymerization can be via free-radical polymerization, solution polymerization, gel polymerization, emulsion polymerization, dispersion polymerization, or suspension polymerization. Moreover, polymerization can be performed in an aqueous phase, in inverse emulsion, or in inverse suspension.

Examples of nonionic monomers for preparing the pre-formed synthetic polymers include (meth)acrylamide, alkyl-substituted (meth)acrylamides, aminoalkyl-substituted (meth)acrylamides, alkyliminoalkyl-substituted (meth)acrylamides, vinyl alcohol, vinyl acetate, allyl alcohol, $C_{1-8}$ alkyl (meth)acrylates, hydroxy$C_{1-8}$ alkyl (meth)acrylates such as hydroxyethyl (meth)acrylate, N-vinylformamide, N-vinylacetamide, and (meth)acrylonitrile. As used herein, "poly((meth)acrylamide)s" includes polymer comprising units derived from (meth)acrylamide, alkyl-substituted (meth) acrylamides such as N—$C_{1-8}$ alkyl (meth)acrylamides and N,N-di($C_{1-8}$ alkyl) (meth)acrylamides, aminoalkyl-substituted (meth)acrylamides such as N,N-di(amino($C_{1-8}$ alkyl))-substituted (meth)acrylamides, and (N,N-dialkylamino) alkyl-substituted (meth)acrylamides such as (N,N-di($C_{1-8}$ alkyl)amino)($C_{1-8}$ alkyl) (meth)acrylamides. Specific examples of the foregoing monomers include methacrylamide, N-methyl acrylamide, N-methyl methacrylamide, N,N-dimethyl acrylamide, N-ethyl acrylamide, N,N-diethyl acrylamide, N-cyclohexyl acrylamide, N-benzyl acrylamide, N,N-dimethylaminopropyl acrylamide, N,N-dimethylaminoethyl acrylamide, N-tert-butyl acrylamide, or a combination comprising at least one of the foregoing. In an embodiment, the poly((meth)acrylamide) is a copolymer of methacrylamide with maleic anhydride, vinyl acetate, ethylene oxide, ethylene glycol, or acrylonitrile, or a combination comprising at least one of the foregoing.

Examples of anionic monomers include ethylenically unsaturated anionic monomers having acidic groups or their salts, for example, a carboxylic group, a sulfonic group, a phosphonic group, a salt thereof, the corresponding anhydride or acyl halide, or a combination comprising at least one of the foregoing acidic groups. For example, the anionic monomer can be (meth)acrylic acid, ethacrylic acid, maleic acid, maleic anhydride, fumaric acid, itaconic acid, α-chloroacrylic acid, β-cyanoacrylic acid, β-methylacrylic acid, α-phenylacrylic acid, β-acryloyloxypropionic acid, sorbic acid, α-chlorosorbic acid, 2'-methylisocrotonic acid, cinnamic acid, µ-chlorocinnamic acid, β-stearyl acid, citraconic acid, mesaconic acid, glutaconic acid, aconitic acid, 2-acrylamido-2-methylpropanesulfonic acid, allyl sulfonic acid, vinyl sulfonic acid, allyl phosphonic acid, vinyl phosphonic acid, a salt thereof, or a combination comprising at least one of the foregoing.

Examples of cationic monomers include (N,N-di($C_{1-8}$alkylamino)($C_{1-8}$alkyl) (meth)acrylates (e.g., N,N-dimethylaminoethyl acrylate and N,N-dimethylaminoethyl methacrylate), (wherein the amino group is quaternized to, e.g., a methyl chloride quaternary form), diallyldimethyl ammonium chloride, or any of the foregoing alkyl-substituted (meth)acrylamides and dialkylaminoalkyl-substituted (meth)acrylamides, such as (N,N-di($C_{1-8}$alkyl)amino)$C_{1-8}$alkyl acrylamide, and the quaternary forms thereof such as acrylamidopropyl trimethyl ammonium chloride.

The superabsorbent polymer can contain both cationic substituents and anionic substituents. The cationic substituents and anionic substituents occur in various stoichiometric proportions, for example, a ratio of about 1:1, or one monomer can be present in a greater stoichiometric amount than the other monomer. Representative amphoteric polymers include terpolymers of nonionic monomers, anionic monomers and cationic monomers.

In an embodiment, the superabsorbent polymer includes a repeating unit derived from an acrylate, an acrylic acid or a salt thereof, an acrylamide, a vinylpyrrolidone, a vinyl ester (e.g., vinyl acetate), a vinyl alcohol, a 2-acrylamide-2-methylpropanesulfonic acid, a derivative thereof, or a combination thereof.

The superabsorbent polymer includes a plurality of crosslinks among the polymer chains of the superabsorbent polymer. According to an embodiment, the crosslinks are covalent and result from crosslinking within the superabsorbent polymer. In an embodiment, the crosslinker is an ethylenically unsaturated monomer that contains, e.g., two sites of ethylenic unsaturation (i.e., two ethylenically unsaturated double bonds), an ethylenically unsaturated double bond and a functional group that is reactive toward a functional group (e.g., an amide group) of the polymer chains of the superabsorbent polymer, or several functional groups that are reactive toward functional groups of the polymer chains of the superabsorbent polymer. In an embodiment, the degree of crosslinking in the superabsorbent polymer herein is selected to control the amount of swelling (i.e., fluid absorption or volume expansion) of the superabsorbent polymer.

Exemplary crosslinkers include a di(meth)acrylamide of a diamine such as a diacrylamide of piperazine, a $C_{1-8}$ alkylene bisacrylamide such as methylene bisacrylamide and ethylene bisacrylamide, an N-methylol compounds of an unsaturated amide such as N-methylol methacrylamide or N-methylol acrylamide, a (meth)acrylate esters of a di-, tri-, or tetrahydroxy compound such as ethylene glycol diacrylate, poly(ethyleneglycol) di(meth)acrylate, trimethylopropane tri(meth)acrylate, ethoxylated trimethylol tri(meth) acrylate, glycerol tri(meth)acrylate), ethoxylated glycerol tri(meth)acrylate, pentaerythritol tetra(meth)acrylate, ethoxylated pentaerythritol tetra(meth)acrylate, butanediol di(meth)acrylate), a divinyl or diallyl compound such as allyl (meth)acrylate, alkoxylated allyl(meth)acrylate, diallylamide of 2,2'-azobis(isobutyric acid), triallyl cyanurate, triallyl isocyanurate, maleic acid diallyl ester, polyallyl esters, tetraallyloxyethane, triallylamine, and tetraallylethylene diamine, a diols polyol, hydroxyallyl or acrylate compounds, and allyl esters of phosphoric acid or phosphorous acid. Specifically mentioned are water soluble diacrylates such as poly(ethylene glycol) diacrylate (e.g., PEG 200 diacrylate or PEG 400 diacrylate). A combination comprising any of the above-described crosslinkers can also be used. Additional crosslinks are described in US 2014/0332213, US 2014/0332214, and US 2015/0096751.

In an embodiment, the SAP is a particle (or fiber or other format) that includes surface crosslinks, which occur external to the interior of the SAP. The surface crosslinks, e.g., result from addition of a surface crosslinker to the SAP particle and heat-treatment. The surface crosslinks increase the crosslink density of the SAP near its surface with respect to the crosslinking density of the interior of the SAP. Some surface crosslinkers have a functional group that is reactive toward a group of the polymer chains of the SAP, e.g., an acid or amide group. The surface crosslinker are one of the previously mentioned crosslinkers and include a functional group such as an alcohol, amine, aldehyde, or carboxylate group. In an embodiment, surface crosslinkers have multiple different functional groups such as polyols, polyamines, polyaminoalcohols, and alkylene carbonates. The surface crosslinkers also provide the SAP with a chemical property that the polymer chains of the SAP did not have before surface crosslinking and control chemical properties of the SAP, e.g., hydrophobicity, hydrophilicity, or adhesiveness of the SAP to other materials such as minerals (e.g., silicates) or other chemicals such as petroleum compounds (e.g., hydrocarbons, asphaltene, and the like). Preferably the internal and external crosslinks are formed before the SAP is combined with the aqueous carrier and the proppant particles. Accordingly, the fracturing fluid can be free of crosslinking agents. In an embodiment, the SAP only has internal crosslinks and is free of any external crosslinks.

Non-limiting examples of such superabsorbent polymers are poly(hydroxyC$_{1-8}$ alkyl (meth)acrylate)s such as (2-hydroxyethyl acrylate), poly(meth)acrylamide, poly(vinyl pyrrolidine), poly(vinyl acetate), starch-acrylonitrile grafted copolymer of polyacrylonitrile, carboxymethyl cellulose, crosslinked polyacrylates, sulfonated polystyrene, hydrolyzed polyacrylamide, polyvinyl alcohol, polyethylene oxide, polyvinyl pyrrolidone, polyacrylonitrile, polyacrylic acid, polyacrylic acid salt, and the like. The foregoing are inclusive of copolymers, for example copolymers of (meth) acrylamide with maleic anhydride, vinyl acetate, ethylene oxide, ethylene glycol, or acrylonitrile, or a combination comprising at least one of the foregoing. A combination of different polymers can be used. As a specific example, the superabsorbent polymer is polyacrylamide having crosslinks that are polyethylene glycol diacrylate. As another specific example, the superabsorbent polymer is a copolymer of acrylamide with, for example, maleic anhydride, vinyl acetate, ethylene oxide, ethylene glycol, acrylonitrile, or a combination thereof. Another specific example of superabsorbent polymer is polyacrylamide having crosslinks that are polyethylene glycol diacrylate. In some embodiments, the superabsorbent polymer is polyacrylic acid homopolymer or copolymer, wherein the crosslinks are vinyl ester oligomer. In an embodiment, the superabsorbent polymer is a copolymer of acrylic acid and sodium acrylate with crosslinks derived from polyethylene glycol diacrylate.

The size of the unswelled superabsorbent polymer can have an average largest diameter from 10 μm to 100,000 μm, specifically 50 μm to 10,000 μm, and more specifically 150 μm to 1,000 μm. As used herein, "size" refers to the largest linear dimension, e.g., a diameter in a spherical particle. The superabsorbent polymers can be in a number of formats, including a particle (e.g., a powder), fiber, strand, braid, and the like, or a combination thereof. Particles of the SAP are any shape including spherical, angular, and polyhedral.

The superabsorbent polymers including coated superabsorbent polymers, superabsorbent materials having a three-dimensional network, or a combination thereof are present in a mass concentration from 10 pound of superabsorbent polymer per one thousand gallons of the fracturing fluid (ppt) to 200 ppt, specifically 20 ppt to 100 ppt, and more specifically 30 ppt to 80 ppt.

In addition to the superabsorbent polymer component, a fracturing composition further comprises a carrier fluid such as an aqueous carrier. The aqueous carrier fluid can be fresh water, brine (including seawater), an aqueous acid (for example a mineral acid or an organic acid), an aqueous base, or a combination comprising at least one of the foregoing. It will be appreciated that other polar liquids such as alcohols and glycols, alone or together with water, may be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from the ground. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, ZnCl$_2$, MgCl$_2$, or CaCl$_2$ to increase the density of the brine, such as about 1 to about 0.6 pounds per gallon of CaCl$_2$ brine. Completion brines typically provide a hydrostatic pressure optimized to counter the reservoir pressures downhole. The above brines can be modified to include one or more additional salts. The additional salts included in the brine can be NaCl, KCl, NaBr, MgCl$_2$, CaCl$_2$, CaBr$_2$, ZnBr$_2$, NH$_4$Cl, sodium formate, cesium formate, and combinations comprising at least one of the foregoing. The salt can be present in the brine in an amount of about 0.5 to about 50 weight percent (wt. %), specifically about 1 to about 40 wt. %, and more specifically about 1 to about 25 wt %, based on the weight of the fluid.

The aqueous carrier fluid can be an aqueous mineral acid that includes hydrochloric acid, nitric acid, phosphoric acid, sulfuric acid, boric acid, hydrofluoric acid, hydrobromic acid, perchloric acid, or a combination comprising at least one of the foregoing. The fluid can be an aqueous organic acid that includes a carboxylic acid, sulfonic acid, or a combination comprising at least one of the foregoing. Exemplary carboxylic acids include formic acid, acetic acid, chloroacetic acid, dichloroacetic acid, trichloroacetic acid, trifluoroacetic acid, propionic acid, butyric acid, oxalic acid, benzoic acid, phthalic acid (including ortho-, meta- and para-isomers), and the like. Exemplary sulfonic acids include a C$_{1-20}$ alkyl sulfonic acid, wherein the alkyl group can be branched or unbranched and can be substituted or unsubstituted, or a C$_{3-20}$ aryl sulfonic acid wherein the aryl group can be monocyclic or polycyclic, and optionally comprises 1 to 3 heteroatoms (e.g., N, S, or P). Alkyl sulfonic acids can include, for example, methane sulfonic acid. Aryl sulfonic acids can include, for example, benzene sulfonic acid or toluene sulfonic acid. In some embodiments, the aryl group can be C$_{1-20}$ alkyl-substituted, i.e., is an alkylarylene group, or is attached to the sulfonic acid moiety via a C$_{1-20}$ alkylene group (i.e., an arylalkylene group), wherein the alkyl or alkylene can be substituted or unsubstituted.

The hydraulic fracturing composition further comprises proppant particles. The proppant particles include a ceramic, sand, a mineral, a nut shell, gravel, glass, resinous particles, polymeric particles, or a combination thereof. In an embodiment, the proppant particles are selected depending on the particular application of the hydraulic fracturing composition. Examples of the ceramic include an oxide-based ceramic, nitride-based ceramic, carbide-based ceramic, boride-based ceramic, silicide-based ceramic, or a combination thereof. In an embodiment, the oxide-based ceramic is silica (SiO$_2$), titanium dioxide (TiO$_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Examples of suitable sands for the proppant particles include, but are not limited to, Arizona sand, Wisconsin sand, Nebraska sand, Badger sand, Brady sand, and Ottawa sand. In an embodiment, the proppant particles made of a mineral such as bauxite are sintered to obtain a hard material. In an embodiment, the bauxite or sintered bauxite has a relatively high permeability such as the bauxite material disclosed in U.S. Pat. No. 4,713,203, the content of which is incorporated by reference herein in its entirety.

Naturally occurring proppant particles include nut shells such as walnut, coconut, pecan, almond, ivory nut, brazil nut, and the like; seed shells of fruits such as plum, olive, peach, cherry, apricot, and the like; seed shells of other plants such as maize (e.g., corn cobs or corn kernels); wood materials such as those derived from oak, hickory, walnut, poplar, mahogany, and the like. Such materials are particles formed by crushing, grinding, cutting, chipping, and the like. These proppant particles are relatively lightweight and/or substantially neutrally buoyant proppant particulates, which have been described in U.S. Pat. No. 6,364,018. By "relatively lightweight" it is meant that a particulate has a density that is substantially less than a conventional proppant particulate material employed in hydraulic fracturing operations, e.g., sand or having a density similar to these materials. By "substantially neutrally buoyant", it is meant that a particulate has a density sufficiently close to the density of a selected ungelled or weakly gelled carrier fluid (e.g., ungelled or weakly gelled completion brine, other aqueous-based fluid, or other suitable fluid) to allow pumping and satisfactory placement of the proppant particulate using the selected ungelled or weakly gelled carrier fluid. Relatively lightweight and substantially neutrally buoyant proppant particles are commercially available as LiteProp™ from Baker Hughes Inc.

In an embodiment, the proppant particles are coated, e.g., with a resin. That is, individual proppant particles have a coating applied thereto. In this manner, if the proppant particles are compressed during or subsequent to, e.g., fracturing, at a pressure great enough to produce fine particles therefrom, the fine particles remain consolidated within the coating so they are not released into the formation. It is contemplated that fine particles decrease conduction of hydrocarbons (or other fluid) through fractures or pores in the fractures and are avoided by coating the proppant particles. Coating for the proppant particles includes cured, partially cured, or uncured coatings of, e.g., a thermoset or thermoplastic resin. Curing the coating on the proppant particles occurs before or after disposal of the proppant particles in the SAP or before or after disposal of the hydraulic fracturing composition downhole, for example.

In an embodiment, the coating is an organic compound that includes epoxy, phenolic, polyurethane, polycarbodiimide, polyamide, polyamide imide, furan resins, or a combination thereof. The phenolic resin is, e.g., a phenol formaldehyde resin obtained by the reaction of phenol, bisphenol, or derivatives thereof with paraformaldehyde. Exemplary thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Exemplary thermosets include epoxy, phenolic (a true thermosetting resin such as resole or a thermoplastic resin that is rendered thermosetting by a hardening agent), polyester resin, polyurethanes, epoxy-modified phenolic resin, and derivatives thereof.

In an embodiment, the curing agent for the coating is nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; sulfur-containing compounds such as polysulfides, polymercaptans; and catalytic curing agents such as tertiary amines, Lewis acids, Lewis bases; or a combination thereof.

In an embodiment, the proppant particles include a crosslinked coating. The crosslinked coating typically provides crush strength, or resistance, for the proppant particles and prevents agglomeration of the proppant particles even under high pressure and temperature conditions. In some embodiments, the proppant particles have a curable coating, which cure subsurface, e.g. downhole or in a fracture. The curable coating cures under the high pressure and temperature conditions in the subsurface reservoir. Thus, the proppant particles having the curable coating are used for high pressure and high temperature conditions.

According to an embodiment, the coating is disposed on the proppant particles by mixing in a vessel, e.g., a reactor. Individual components, e.g., the proppant particles and resin materials (e.g., reactive monomers used to form, e.g., an epoxy or polyamide coating) are combined in the vessel to form a reaction mixture and are agitated to mix the components. Further, the reaction mixture is heated at a temperature or at a pressure commensurate with forming the coating. In another embodiment, the coating is disposed on the particle via spraying such as by contacting the proppant particles with a spray of the coating material. The coated proppant particles are heated to induce crosslinking of the coating.

The proppant particles have a size from 1 μm to 2000 μm, specifically 10 μm to 1000 μm, and more specifically 10 μm to 500 μm. Further, the proppant particles have any shape including spherical, angular, and polyhedral and are monodisperse or polydisperse with an average particle size distribution that is unimodal or multimodal, e.g., bimodal.

In the hydraulic fracturing composition, the proppant particles are present in an amount effective to prop open the fracture without the geometry of the fracture being altered during settling of the formation when the proppant is released from the superabsorbent polymer. In a particular embodiment, the proppant particles are present in a mass concentration from 0.1 pounds per gallon (lb/gal) to 20 lb/gal, specifically 0.25 lb/gal to 16 lb/gal, and more specifically 0.25 lb/gal to 12 lb/gal, based on the total volume of the composition. In the hydraulic fracturing composition, any ratio of the amount of the proppant particles to the amount of the SAP is applicable as long as the proppant particles are suspended in the gel formed by the superabsorbent polymer.

The hydraulic fracturing composition can further include a breaker in some embodiments. The breaker contacts the superabsorbent polymer to break the superabsorbent polymer. In an embodiment, the breaker contacts the superabsorbent polymer and breaks a bond in the backbone of the polymer chains of the superabsorbent polymer, a bond in the crosslinker, a bond between the crosslinker and a polymer chain of the superabsorbent polymer, or a combination thereof. That is, breaking the superabsorbent polymer includes disintegrating, decomposing, or dissociating the superabsorbent polymer such as by breaking bonds in the backbone of the superabsorbent polymer, breaking crosslinks among chains of the superabsorbent polymer, changing a geometrical conformation of the superabsorbent polymer, or a combination thereof. In this way, the viscosity of the hydraulic fracturing composition decreases. In some embodiments, the breaker breaks the superabsorbent polymer to form a decomposed polymer such as a plurality of fragments that have a lower molecular weight than the superabsorbent polymer.

The breaker includes an oxidizer such as a peroxide, a persulfate, a perphosphate, a perborate, a percarbonate, a persilicate, an oxyacid of a halogen, an oxyanion of halogen, a peracid, a derivative thereof, or a combination thereof.

The breaker is optionally encapsulated in an encapsulating material to prevent the breaker from contacting the superabsorbent polymer. The encapsulating material is configured to release the breaker in response to the breaking condition. The breaker is a solid or liquid. As a solid, the breaker is, e.g., a crystalline or granular material. In an embodiment, the solid is encapsulated or provided with a coating to delay its release or contact with the SAP. Encapsulating materials are the same or different as the coating material noted above with regard to the proppant particles. Methods of disposing the encapsulating material on the breaker are the same or different as for disposing the coating on the proppant particles. In an embodiment, a liquid breaker is dissolved in an aqueous solution or another suitable solvent.

To maximize the benefits of fracturing compositions or fluids, the fluids should be broken down to minimal viscosity and be allowed to flow back before the production. A "latent" breaker or later injection of breaker is preferred because the fluids can function as if no breaker is present when carrying the proppants downhole. After the fracture treatment is completed, the breaking of the superabsorbent polymers can be triggered so that the fluid can flow back to the surface with minimal formation damage.

In an embodiment, the hydraulic fracturing composition is modified by including a slow-release acid inside or outside the superabsorbent polymer particulates or fibers to lower pH and accelerate breaking at a later stage. After creating the fracture, the hydraulic fracturing composition transports proppant particles into the fracture. Accordingly, the superabsorbent polymer is configured to be broken after the proppant placement. The viscosity of the fracturing fluid will be reduced if pH decreases. A slow-release acid will reduce the pH after the proppant particles have been placed in the fracture, thus allowing the fracturing composition to thin out and flow back to the surface. The acid can be glyoxal, a solid acid, an encapsulated acid, or a combination thereof. Glyoxal is a dialdehyde that can slowly release acids via Cannizzaro-type self-disproportionation reaction. Slow release of acids can overcome a buffering agent, if present, and result in gradual reduction of the fluid pH until a selected pH value is attained that is suitable for breaking the superabsorbent polymer.

In an embodiment, a composite of the superabsorbent polymer and a slow-release breaking agent is provided. Any of the superabsorbent polymers disclosed herein can be used. The slow-release breaker includes a slow-release acid as disclosed herein. Methods of forming the composites are not particularly limited. In an embodiment, the slow-release breaker is compounded with the superabsorbent polymer then extruded forming pellets or particles containing the slow-release breaker inside the individual pellets or particles of the composite. The fracturing composition can contain a combination of different superabsorbent polymer components. For example, a composite of a polyvinyl alcohol (PVA)-based superabsorbent polymer and a slow-release acid can be used together with superabsorbent polymer not loaded with any breaker insider SAP particles.

The breaker can be present in the hydraulic fracturing composition in a mass concentration from 0.1 ppt to 20 ppt, specifically 0.2 ppt to 15 ppt, and more specifically, 0.25 ppt to 10 ppt, based on the total volume of the fluid.

It has also been found that the timing to break superabsorbent polymers in a low temperature well, i.e., a well having a temperature of less than about 200° F., can be controlled by using a high temperature breaker. As used herein, a high temperature breaker refers to a compound that is effective to break a superabsorbent polymer at a temperature of greater than about 250° F. in the absence of any activator. A specific example of such a high temperature breaker is sodium bromate. Advantageously, in the presence of an activator such as sorbic acid; a ferrous salt; a copper (I) salt; or erythorbic acid or a salt thereof such as sodium erythorbate; or a combination comprising at least one of the foregoing, the high temperature breaker can be activated and is effective to break superabsorbent polymers at a temperature of less than about 200° F., for example about 170° F. to about 180° F.

In an embodiment, a high temperature breaker and an encapsulated activator are both included in a fracturing composition, and delivered to a subterranean formation at the same time. At a downhole temperature of less than 200° F., the high temperature breaker does not break the superabsorbent polymer. Once the proppant is placed in the fracture, the activator is released from the encapsulant and activates the high temperature breaker so that the high temperature breaker or a derivative thereof breaks the superabsorbent at a temperature less than about 200° F. The encapsulant can be the same as the coating material noted above with regard to the proppant particles. The fracturing composition comprises about 1 pound to about 10 pounds of the breaker and about 1 pound to about 4 pounds of the encapsulated activator per one thousand gallons of the fracturing composition.

Alternatively, the high temperature breaker can be pumped together with the fracturing fluid containing the superabsorbent polymers. Then a second fluid loaded with an activator for the high temperature breaker is injected to activate the high temperature breaker. Of course, the activator can be injected with the fracturing fluid containing the superabsorbent polymers, and a second fluid containing the high temperature breaker can be injected later to break the superabsorbent polymers. The high temperature breaker can be present in an amount of about 1 pound to about 10 pounds per one thousand gallons of the breaker-containing composition, and the activator can be present in an amount of about 1 pound to about 4 pounds per one thousand gallons of the activator-containing composition.

In other embodiments, a subterranean formation is treated with a fracture composition that is free of breakers, then a fluid containing a carrier and a low-temperature breaker can be injected to break the superabsorbent polymer in a downhole environment having a temperature of less than about 200° F. As used herein, a low temperature breaker refers to a breaker that is effective to break a superabsorbent polymer at a temperature of less than about 200° F. without using any activator. Low temperature breakers can be one or more of the following: a peroxide; a persulfate; a perphosphate; a perborate; a percarbonate; a persilicate; an oxyacid of a halogen; an oxyanion of halogen; a peracid; or a derivative thereof. Exemplary low temperature breakers include sodium persulfate; ammonium persulfate, and potassium persulfate.

The hydraulic fracturing compositions can further comprise other components known for use in fracturing compositions, for example a viscosifier, a viscosifier crosslinker, a pH control agent, a surfactant, a breaker, a lubricant, a fluid loss agent, a clay stabilizer, a biocide, an acid, a corrosion inhibitor, an oxygen scavenger, or a combination comprising at least one of the foregoing. These additional components are selected so as to avoid imparting unfavorable characteristics to the hydraulic fracturing composition, to avoid damage to equipment in contact with the fracturing composition, and to avoid damaging the wellbore or subterranean formation. The additives as well as the amounts of the additives are known and have been described for example in U.S. 2014/03322123 and U.S. 2014/0332214.

The fracturing composition can be a liquid or a foam. The carrier fluid can be foamed with a liquid hydrocarbon or a gas or liquefied gas such as nitrogen, carbon dioxide, a natural gas, air, or a combination comprising at least one of the foregoing. The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts and alkyl amido amine quaternary ammonium salts. Foam system is mainly used in fracturing low pressure or water sensitive formations.

In another embodiment, superabsorbent polymers are used as a fluid loss additive for conventional type fracturing processes. The addition of fluid loss additive is used to improve the fracturing fluid efficiency during the fracturing to reduce the amount of fluid leaked off to the formation, and in doing so preserving the created facture width that is generated in order to place the desired amount of proppant into the formation. Superabsorbent polymers can be used in a standalone application to treat both water-based and non-water-based fracturing fluids. For fracturing fluids such as water, oil (hydrocarbon), methanol, glycerin, $CO_2$, natural gas, and the like, the addition into the treatment of a hydrated or partially hydrated superabsorbent polymers slurried in a carrier solution can be performed. This is particularly advantageous for use in hydrocarbon based fluids where the lack of water often requires the use of much less efficient fluid loss alternatives such as silica fluid to be run, which are problematic due to the damaging characteristics of the material. Accordingly, disclosed is a method of fracturing a subterranean formation penetrated by a well, the method comprising: forming a fracturing composition comprising a carrier fluid, a linear guar, a superabsorbent polymer present in an amount effective to reduce fluid loss during a fracturing operation, and optionally a crosslinking agent for the guar; and pumping the hydraulic fracturing composition into the subterranean formation to create or enlarge a fracture. The amount of the superabsorbent polymer is about 5 pound to about 100 pound, specifically about 10 pound to about 70 pounds per one thousand gallons of the fracturing composition.

Set forth below are various embodiments of the disclosure.

Embodiment 1

A method of fracturing a subterranean formation penetrated by a well, the method comprising: forming a fracturing composition comprising a carrier fluid; and a superabsorbent polymer component comprising one or more of the following: a first composite of a proppant and a first superabsorbent polymer in an unhydrated form, the first superabsorbent polymer being at least partially embedded in a void area of the proppant; a coated superabsorbent polymer; a superabsorbent material having a three-dimensional network; or a second composite of a second superabsorbent polymer and a slow-release breaker; and pumping the hydraulic fracturing composition into the subterranean formation to create or enlarge a fracture.

Embodiment 2

The method of Embodiment 1, wherein the fracturing composition comprises about 30 pounds to about 80 pounds of the first composite per one thousand gallons of the fracturing composition.

Embodiment 3

The method of Embodiment 1 or Embodiment 2, wherein the proppant in the first composite has an apparent specific gravity of less than about 2.4.

Embodiment 4

The method of Embodiment 1, wherein the slow-release breaker in the second composite comprises one or more of the following: glyoxal or an encapsulated acid.

Embodiment 5

The method of Embodiment 1 or Embodiment 4, wherein the second composite comprises a slow-release breaker and a crosslinked polyvinyl-based superabsorbent polymer.

Embodiment 6

The method of Embodiment 1, wherein the superabsorbent material having a three-dimensional network comprises a superabsorbent polymer having negative charges bonded to a cationic or a nonionic polymer, or a combination thereof.

Embodiment 7

The method of Embodiment 6, wherein the superabsorbent polymer having negative charges is a crosslinked copolymer of acrylic acid and acrylate.

Embodiment 8

The method of Embodiment 6 or Embodiment 7, wherein the cationic polymer is a cationic acrylamide copolymer; and the nonionic polymer comprises polyvinyl alcohol, polyvinyl acetate, or a combination thereof.

Embodiment 9

A method of fracturing a subterranean formation penetrated by a well, the method comprising: forming a fracturing composition comprising a carrier fluid; a proppant; about 10 pounds to about 100 pounds of a superabsorbent polymer per one thousand gallons of the fracturing composition; and about 1 pound to about 30 pounds of a viscosity modifying agent per one thousand gallons of the fracturing composition, the viscosity modifying agent comprising one or more of the following: diutan; starch-acrylonitrile graft polymer hydrolysate; sulfonated polystyrene; polyvinyl alcohol; polyvinyl pyrrolidone; or polyacrylonitrile; and pumping the hydraulic fracturing composition into the subterranean formation to create or enlarge a fracture.

Embodiment 10

A method of fracturing a subterranean formation penetrated by a well, the method comprising: forming a fracturing composition comprising a carrier fluid; a proppant; about 30 pounds to about 80 pounds of a polymer comprising one or more of the following: konjac glucomannan; starch-acrylonitrile graft polymer hydrolysate; carboxymethyl cellulose; crosslinked polyacrylates; sulfonated polystyrene; hydrolyzed polyacrylamide; polyvinyl alcohol; polyvinyl acetate; polyethylene oxide; polyvinyl pyrrolidone; or polyacrylonitrile.

Embodiment 11

A method of fracturing a subterranean formation penetrated by a well, the method comprising: forming a fracturing composition comprising a carrier fluid, a linear guar, a superabsorbent polymer present in an amount effective to reduce fluid loss during a fracturing operation, optionally a crosslinking agent for the linear guar; and pumping the hydraulic fracturing composition into the subterranean formation to create or enlarge a fracture.

Embodiment 12

The method of Embodiment 11, wherein the carrier fluid is an oil-based carrier, and the superabsorbent polymer is in a hydrated or partially hydrated form.

Embodiment 13

The method of Embodiment 11, wherein the carrier fluid is a foam comprising a liquid hydrocarbon, a gas, a liquefied gas, or a combination comprising at least one of the foregoing.

Embodiment 14

The method of any one of Embodiments 11 to 13, wherein the fracturing fluid comprises about 30 pounds to about 80 pounds of the superabsorbent polymer per one thousand gallons of the fracturing composition.

Embodiment 15

A method of fracturing a subterranean formation penetrated by a well, the method comprising: forming a fracturing composition comprising a carrier fluid, a proppant, a superabsorbent polymer, a breaker effective to break the superabsorbent polymer at a temperature greater than about 250° F. in the absence of any activators, an encapsulated activator comprising an activator encapsulated within an encapsulant, the activator being effective to activate the breaker so that the breaker or a derivative thereof breaks the superabsorbent at a temperature less than about 200° F.; pumping the hydraulic fracturing composition into the subterranean formation to create or enlarge a fracture; allowing the activator to diffuse out of the encapsulant; and breaking the superabsorbent polymer.

Embodiment 16

The method of Embodiment 15, wherein the subterranean formation has an environmental temperature of less than about 200° F.

Embodiment 17

The method of Embodiment 15 or Embodiment 16, wherein the breaker is sodium bromate.

Embodiment 18

The method of any one of Embodiments 15 to 17, wherein the fracturing composition comprises about 1 pound to about 10 pounds of the breaker per one thousand gallons of the fracturing composition.

Embodiment 19

The method of any one of Embodiments 15 to 18, wherein the activator comprises one or more of the following: sorbic acid; a ferrous salt; a copper (I) salt; or erythorbic acid or its salt.

Embodiment 20

The method of any one of Embodiments 15 to 19, wherein the fracturing composition comprises about 1 pound to about 4 pounds of the encapsulated activator per one thousand gallons of the fracturing fluid.

Embodiment 21

The method of any one of Embodiments 15 to 19, wherein the fracturing composition comprises a composite of the superabsorbent polymer and the proppant.

Embodiment 22

A method of fracturing a subterranean formation penetrated by a well, the method comprising: injecting into the subterranean formation a first fracturing composition comprising a first carrier fluid, a proppant, a superabsorbent polymer, and one of a breaker and an activator for the breaker; injecting a second fracturing composition into the subterranean formation, the second fracturing composition comprising a second carrier fluid, and the breaker or the activator not included in the first fracturing composition; and breaking the superabsorbent polymer after injecting the second fracturing composition at a temperature of less than about 200° F.

Embodiment 23

The method of Embodiment 22, wherein the breaker is sodium bromate.

Embodiment 24

The method of Embodiment 22 or Embodiment 23, wherein the first or second fracturing composition comprises about 1 pound to about 10 pounds of the breaker per one thousand gallons of the first or second fracturing composition.

Embodiment 25

The method of any one of Embodiments 22 to 24, wherein the activator comprises one or more of the following: sorbic acid; a ferrous salt; a copper (I) salt; or erythorbic acid or its salt.

Embodiment 26

The method of any one of Embodiments 22 to 25, wherein the first or second fracturing composition comprises about 1 pound to about 4 pounds of the activator per one thousand gallons of the first or second fracturing fluid.

Embodiment 27

The method of any one of Embodiments 22 to 26, wherein the first fracturing composition comprises a composite of the superabsorbent polymer and the proppant.

Embodiment 28

A method of fracturing a subterranean formation penetrated by a well, the method comprising: injecting into the subterranean formation a first fracturing composition comprising a first carrier fluid, a proppant, and a superabsorbent polymer, the first fracturing composition being free of breakers for the superabsorbent polymer; injecting a second fracturing composition into the subterranean formation, the second fracturing composition comprising a second carrier fluid, and a breaker effective to break the superabsorbent polymer at a temperature of less than about 200° F.; and breaking the superabsorbent polymer after injecting the second fracturing composition.

Embodiment 29

The method of Embodiment 28, wherein the breaker is one or more of the following: a peroxide; a persulfate; a perphosphate; a perborate; a percarbonate; a persilicate; an oxyacid of a halogen; an oxyanion of halogen; a peracid; or a derivative thereof.

Embodiment 30

The method of Embodiment 28 or Embodiment 29, wherein the breaker is one or more of the following: sodium persulfate; ammonium persulfate; or potassium persulfate.

Embodiment 31

The method of any one of Embodiments 28 to 30, wherein the first fracturing composition comprises a composite of the superabsorbent polymer and the proppant.

All ranges disclosed herein are inclusive of the endpoints, and the endpoints are independently combinable with each other. "Or" means "and/or." As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of fracturing a subterranean formation penetrated by a well, the method comprising:
    injecting into the subterranean formation a first fracturing composition comprising
        a first carrier fluid,
        a proppant,
        a superabsorbent polymer, and
        one of a breaker and an activator for the breaker;
        wherein the breaker is a bromate breaker, and the breaker is effective to break the superabsorbent polymer at a temperature greater than about 250° F. in the absence of any activators, and
        the activator comprises one or more of the following: sorbic acid; a ferrous salt a copper (I) salt or erythorbic acid or its salt, and the activator is effective to activate the breaker so that the breaker or a derivative thereof breaks the superabsorbent polymer at a temperature less than about 200° F.;
    injecting a second fracturing composition into the subterranean formation, the second fracturing composition comprising
        a second carrier fluid, and
        the other of the breaker and the activator for the breaker compared to the first fracturing composition; and
    breaking the superabsorbent polymer after injecting the second fracturing composition at a temperature of less than about 200° F.

2. The method of claim 1, wherein the breaker is sodium bromate.

3. The method of claim 1, wherein the first fracturing composition comprises about 1 pound to about 10 pounds of the breaker per one thousand gallons of the first fracturing composition.

4. The method of claim 3, wherein the second fracturing composition comprises about 1 pound to about 4 pounds of the activator per one thousand gallons of the second fracturing fluid.

5. The method of claim 1, wherein the second fracturing composition comprises about 1 pound to about 10 pounds of the breaker per one thousand gallons of the second fracturing composition.

6. The method of claim 5, wherein the first fracturing composition comprises about 1 pound to about 4 pounds of the activator per one thousand gallons of the first fracturing fluid.

7. The method of claim 1, wherein the superabsorbent polymer comprises a repeating unit derived from an acrylate, an acrylic acid or a salt thereof, an acrylamide, a vinylpyrrolidone, a vinyl ester, a vinyl alcohol, a 2-acrylamide-2-methylpropanesulfonic acid, a derivative thereof, or a combination thereof, and the superabsorbent polymer has crosslinks derived from ethyleneglycol diacrylate, polyethyleneglycol diacrylate, trimethylopropane trimethacrylate, ethoxylated trimethylol triacrylate, ethoxylated pentaerythritol tetracrylate, or a combination comprising at least one of the foregoing.

8. The method of claim 1, wherein the first fracturing composition comprises a composite of the superabsorbent polymer and the proppant.

* * * * *